US010459918B1

(12) United States Patent
Edwards, Jr. et al.

(10) Patent No.: US 10,459,918 B1
(45) Date of Patent: Oct. 29, 2019

(54) GENERATING QUERY RESULTS BASED ON DATA PARTITIONS

(71) Applicant: Amazon Technologies, Inc., Seattle, WA (US)

(72) Inventors: David John Edwards, Jr., Woodinville, WA (US); Karanpal Singh Kalsi, Seattle, WA (US); Sanjay Govindrao Kulkarni, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 591 days.

(21) Appl. No.: 15/195,813

(22) Filed: Jun. 28, 2016

(51) Int. Cl.
*G06F 16/2453* (2019.01)
*G06F 16/2458* (2019.01)

(52) U.S. Cl.
CPC .... *G06F 16/24542* (2019.01); *G06F 16/2471* (2019.01)

(58) Field of Classification Search
CPC .......... G06F 16/24542; G06F 16/2471; G06F 17/30463; G06F 17/30545
USPC ........................................ 707/718
See application file for complete search history.

(56) References Cited

U.S. PATENT DOCUMENTS

2005/0177553 A1* 8/2005 Berger .............. G06F 17/30333
2009/0182779 A1* 7/2009 Johnson ............ G06F 17/30383
2015/0178631 A1* 6/2015 Thomas ............... G06K 9/0053
706/12
2018/0089328 A1* 3/2018 Bath ................. G06F 17/30946

OTHER PUBLICATIONS

Bhatotia et al., "Slider: Incremental sliding-window computations for large-scale data analysis," CITI, Universidade Nova de Lisboa, Lisbon, Technical Report MPI-SWS_2012-004 (Sep. 2012), 15 pages.
Tangwongsan et al., "General incremental sliding-window aggregation," Proceedings of the VLDB Endowment, vol. 8, Issue 7 (Feb. 2015), pp. 702-713.

* cited by examiner

*Primary Examiner* — Dung K Chau
(74) *Attorney, Agent, or Firm* — Kilpatrick Townsend & Stockton LLP

(57) ABSTRACT

Techniques for improving efficiency of data processing associated with data queries are described. For example, a computer system may access a first query result of a first time window that result may have been generated based on first transformed data stored in data partitions associated with the first time window. The computer system may access data corresponding to a time unit that falls outside of the first time window and inside a second time window. The first time window and the second time window may have overlapping time units. The computer system may generate a data partition that corresponds to the time unit and that stores second transformed data. The second transformed data may correspond to a data transformation of the data. The computer system may generate a second query result for the second time window based on the second transformed data and the first query result.

20 Claims, 9 Drawing Sheets

GENERATING QUERY RESULTS BASED ON DATA PARTITIONS

BACKGROUND

More and more users are turning to online resources. Generally, online activities may be tracked for various reasons including, for instance, security. For example, access to an online resource may be granted or denied based on user history. As the type and amount of online access and resources increase, the amount of tracked data may also increase.

Various data processing systems may be available to process the tracked data. The performance of such systems may depend on a number of parameters. Example parameters include the amount of the tracked data, processing power, memory capacity, network bandwidth, and other computing system-related parameters. In certain situations, the parameters may constraint the processing. For example, if the amount of tracked data is too large and the processing power is relatively small, the processing may be fail or may span a long period of time.

BRIEF DESCRIPTION OF THE DRAWINGS

Various embodiments in accordance with the present disclosure will be described with reference to the drawings, in which.

DETAILED DESCRIPTION

Figure 1:
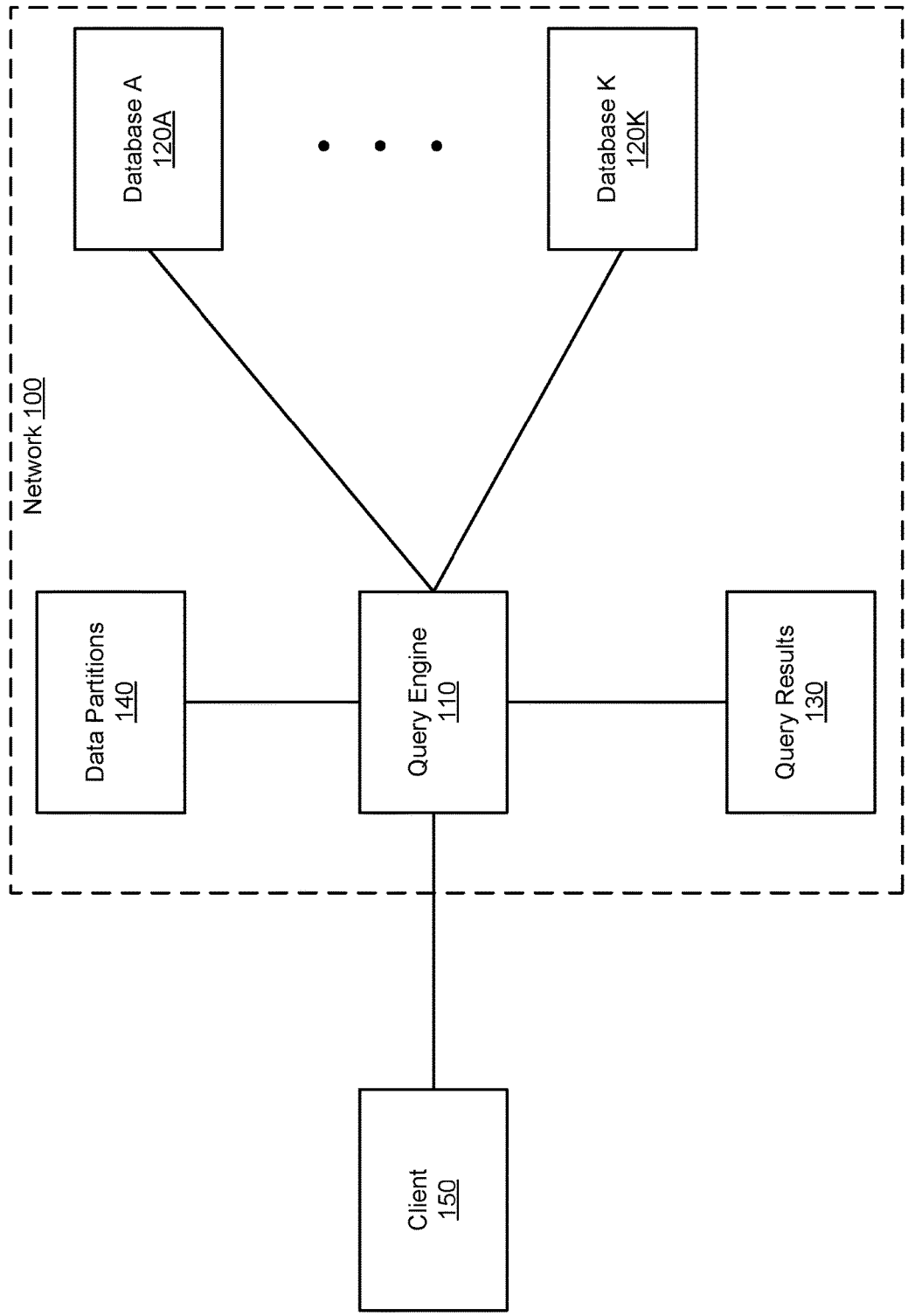
FIG. 1 illustrates an example computing environment for processing data that may be distributed within a network, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to improving performance of a data processing system. In an example, data may be stored at different storage locations across one or more networks. Data updates may be made to the existing data and/or new data may be stored at a particular rate. Such updates and changes may represent incremental changes to the existing data. To improve the performance, the data processing system may be configured for incremental processing without necessarily moving the stored data from the different storage locations to a central storage location.

In an example, the incremental processing may involve data partitions and time windows. As far as data partitions, the data processing system may generate data partitions from the existing data. Each data partition may correspond to a time unit of a certain resolution (e.g., one day worth of data) and may store processed data. The processed data may be generated by processing existing data that corresponds to the time unit. In addition, the data processing system may track, over time, data updates applicable to the data partitions. Further, as new data becomes available, the data processing system may generate new data partitions.

As far as time window, a cold start situation may exist where no initial processing may have been completed. From that point on, incremental processing may become possible. Particularly, in a cold start situation, an initial time window may span a number of time units (e.g., one month). The data processing system may process data available from the data partitions that correspond to the time units to generate an initial result. Thereafter, the data processing may become incremental for other time windows. For example, for a time window that partially overlaps with the initial time window, the data processing system may access data from non-overlapping data partitions. The data processing system may incrementally generate a new result by updating the initial result based on the accessed data.

The incremental processing may improve the performance of the data processing system. Relative to existing data processing systems, the incremental processing may mitigate or reduce the impact of various parameters to the data processing by achieving a better balance between these parameters. The parameters may include the amount of data to be processed, available processing power, available memory capacity, available network bandwidth, and/or other computing system-related parameters. For example, by processing the data incrementally without having to move the data to a central storage location, a larger amount of data may be processed over time given certain processing power, memory capacity, and network bandwidth. This capability may translate to multiple improvements including, flexibility and efficiency. In particular, the data processing may be scalable as a function of data partitions. The data processing system may be scaled up if there is an increase in the data amount. Conversely, the data processing system may be scaled down if there is a decrease. In addition, the incremental processing may avoid the need to repeatedly process overlapping data across multiple time windows, thereby improving usage of processors, memory, and network bandwidth.

To illustrate, consider an example of tracking data for security purposes. In this example, a service provider may operate a number of data centers distributed at different geographic locations. Client access to the data centers may be tracked to enhance security associated with access to hosted computing resources. This tracking may include storing data about locations of requesting clients and types of requested computing resources. The enhanced security may involve client authentication based on tracked data. In particular, a data processing system may process tracked data of a client and detect an access pattern. If a current access request of the client deviates from the access pattern (e.g., by originating from an unusual location or by requesting an unusual computing resource), the current access request may be denied.

In the above illustrative example, the tracked data may be stored in different databases across the data centers. For each day (or some other resolution of time unit), the data processing system may access the tracked data for that day from the databases, process the tracked data, and generate a data partition that stores the processed data. The processed data may represent a probability distribution for an access request originating from a geographic location. For instance, a data transformation may be applied to the tracked data to generate a cumulative distribution function (CDF). Over a current period of thirty days (or some other duration of a time window), the data processing system may generate a current probability distribution based on the processed data stored in the corresponding thirty data partitions. A next thirty day period may have, for instance, an overlap of twenty-nine days with the current time period. In other words, the two time periods may have twenty-nine days of overlapping data and two days of non-overlapping data. Two data partitions, one for each of the two days, may store processed data for the non-overlapping data. For the next thirty day period, the data processing system may incrementally generate a next probability distribution function by updating the current probability distribution function based on the processed data stored in the two data partitions corresponding to the non-overlapping data. Thus, rather than having to re-compute the next probability distribution from tracked data anew, incrementally updating the current, already computed probability distribution may be sufficient.

Further, the data processing system may store the processed data for each time window (e.g., the probability distributions in the above example) as query results according to a query result format. Hence, an operator of the service provider (e.g., whether human or an automated process) may easily query the tracked data. In turn, the data processing system may efficiently and promptly return query results. For instance, as part of enhancing security based on client authentication, the operator may query the data processing system to determine the likelihood of the client being authenticated based on the client's current location and the currently requested computing resource. That likelihood may be derived from the query results. If greater than a certain a likelihood threshold, the client may be authenticated.

In the interest of clarity of explanation, embodiments of the present disclosure may be described using examples of thirty day time windows, each consisting of thirty days, and each day corresponding to a time unit. However, the embodiments are not limited as such. Instead, any duration of a time window may be possible (e.g., an hour, a day, a week, a month, a quarter, a year, etc.). Additionally, any time unit resolution may be possible (such as per minute, hour, day, week, etc.). Generally, a time window may represent a period of time that may be made of multiple time units, where the time units may have the same duration or different durations. A time unit may represent a unit of time during which particular data may have been observed. The time unit may be associated with or correspond to the observed data.

FIG. 1 illustrates an example computing environment for processing data that may be distributed within a network 100. The network 100 may represent a computer network that includes different computing resources configured to facilitate the data processing. In an example, the network 100 may include a plurality of storage locations and a query engine 110. Each storage location may store one or more databases 120A-K. Accordingly, the data may be distributed across the databases 120A-K. The query engine 110 may be hosted as a computing service on computing hardware and may be configured to query the data stored in the databases 120A-K and generate query results 130. The query results 130 may be stored at a central storage location and/or may be distributed across a set or all of the storage locations (e.g., may be stored in some or all of the databases 120A-K). A client 150 may interact with the query engine 110 to access the query results 130.

In an example, the query engine 110 may be implemented as a component of the data processing system described herein above. In particular, the query engine 110 may be configured to incrementally generate the query results 130. For instance, for each day (or some other time unit), the query engine 110 may access, from the databases 120A-K, data observed for that day. The query engine 110 may also generate, for each day, a data partition by applying a data transformation to the accessed data. The resulting data partitions 140 may be stored at a central storage location and/or may be distributed across a set or all of the storage locations (e.g., may be stored in some or all of the databases 120A-K). In addition, for a thirty day time window (or some other time window), the query engine 110 may incrementally generate a query result based on an already generated query result of another time window and based on non-overlapping data partitions across the two time windows. These and other operations of the query engine 110 are further illustrated in the next figures.

Each of the databases 120A-K may store raw data observed over time. The raw data may relate to an item (e.g., a client, a computing resource, a service, a product, etc.) and/or a group of items (e.g., an item category). For instance, the raw data may represent tracked data associated with client access to computing resources. The raw data may originate from different data sources. In an example, a data source may be external to the network 100. For instance, the raw data may be provided from mobile devices, or other end user devices. Such data may be collected by a collection service and stored in the databases 120A-K. In turn, the collection service may be internal to the network 100 or may be external. If external, the raw data may be imported from a third party, such as an operator of the collection service. In another example, a data source may be internal to the network 100. For instance, the raw data may relate to interactions with computing resources hosted within the network 100. A collection service may track these interactions and accordingly store the observed raw data in the databases 120A-K.

The client 150 may represent an end user device that may remotely access the query engine 110. In an example, the client 150 may be internal to the network 100. For instance, the client 150 may represent an end user device of an administrator of the network 100 or a computing resource within the network 100. In another example, the client 150 may be external to the network 100. For instance, the client 150 may be a subscriber device that may access the query engine 110 over a public network. Regardless, a user interface available via an application programming interface (API) and/or via a web interface may facilitate the access of the client 150 to the query engine 110.

Rather than querying the raw data, the query engine 110 may enable the client 150 to access the query results 130. For example, the query engine 110 may drive the user interface. The user interface may be presented to the client 150. An operator of the client 150, whether a human or an automated process, may access the user interface to specify parameters associated with querying the databases 120A-K (or, more generally, storage locations) and, in return, access the query results.

In an example, the user interface may present fields for user input. The user input may identify the item(s) of interest, desired databases, database, data transformations, and time durations of the time windows, resolution of the time units, and/or other query-related parameters. Once the user input is received, the query engine 110 may process the raw data from the databases 120A-K, generate the data partitions 140, and generate the query results 130 as applicable. Thereafter, the user interface may enable the client 150 to access and present the query results 130 in, for instance, a dashboard presentation format.

To illustrate, the operator may be interested in statistics about the number of virtual machines that the client 150 instantiated over a rolling thirty day time period. Accordingly, the user input may request, for instance, the average and standard deviation per time period. For each day, the query engine 110 may generate a data partition that stores the number of instantiated virtual machines. Over a first thirty day time period, annotated as "day one" through "day thirty," the query engine 110 may generate a first average and a first standard deviation from the numbers stored in data partitions corresponding to the first time window. The first average and standard deviation may be stored as a first query result. A second thirty day period may have twenty nine days that overlap with the first time window and one non-overlapping day. The twenty-nine days may be annotated as "day two" through "day thirty." The non-overlapping day may be annotated as "day thirty-one." Accordingly for the second next time period, the query engine 110 may incrementally generate a second average and a second standard deviation. For example, the query engine 110 may update the first query result by accounting for the contribution of "day thirty-one" (e.g., the non-overlapping day belonging to the second time window) and by removing the contribution of "day one" (e.g., the non-overlapping day belonging to the first time window). The former and latter contributions may correspond to the numbers stored in the data partitions of "day thirty-one" and "day one," respectively. The query engine 110 may store the second average and standard deviation as a second query result. This process may be repeated over the different rolling time windows to generate the query results 130 specific to the user input of the client 150. Accordingly, the client 150 may access and present the query results 130 for any of the rolling time windows.

The above example is provided for illustrative purposes. Other query-related parameters may be similarly used. For example, more or less complex linear and/or non-linear data transformations (e.g., probability distributions as described herein above) may be specified for an item or a group of items and/or for variable time windows and/or time unit resolutions. Regardless, the query engine 110 may use a similar process of generating data partitions and incrementally generating query results. Generally, a data partition may be generated according to user input and may correspond to a time unit. The data partition may store processed data generated based on an application of a specified data transformation to raw data observed during the time unit. A query result may be generated specifically from data partitions corresponding to time units that form a specified time period.

As described herein above, a query engine (or, more generally, a data processing system) may incrementally generate query results (or, more generally, processed data that may be stored according to a query result format). The incremental processing may rely on data partitions across time windows. Example time windows include the rolling time window of FIG. 2 and the incremental time window of FIG. 3.

Figure 2:
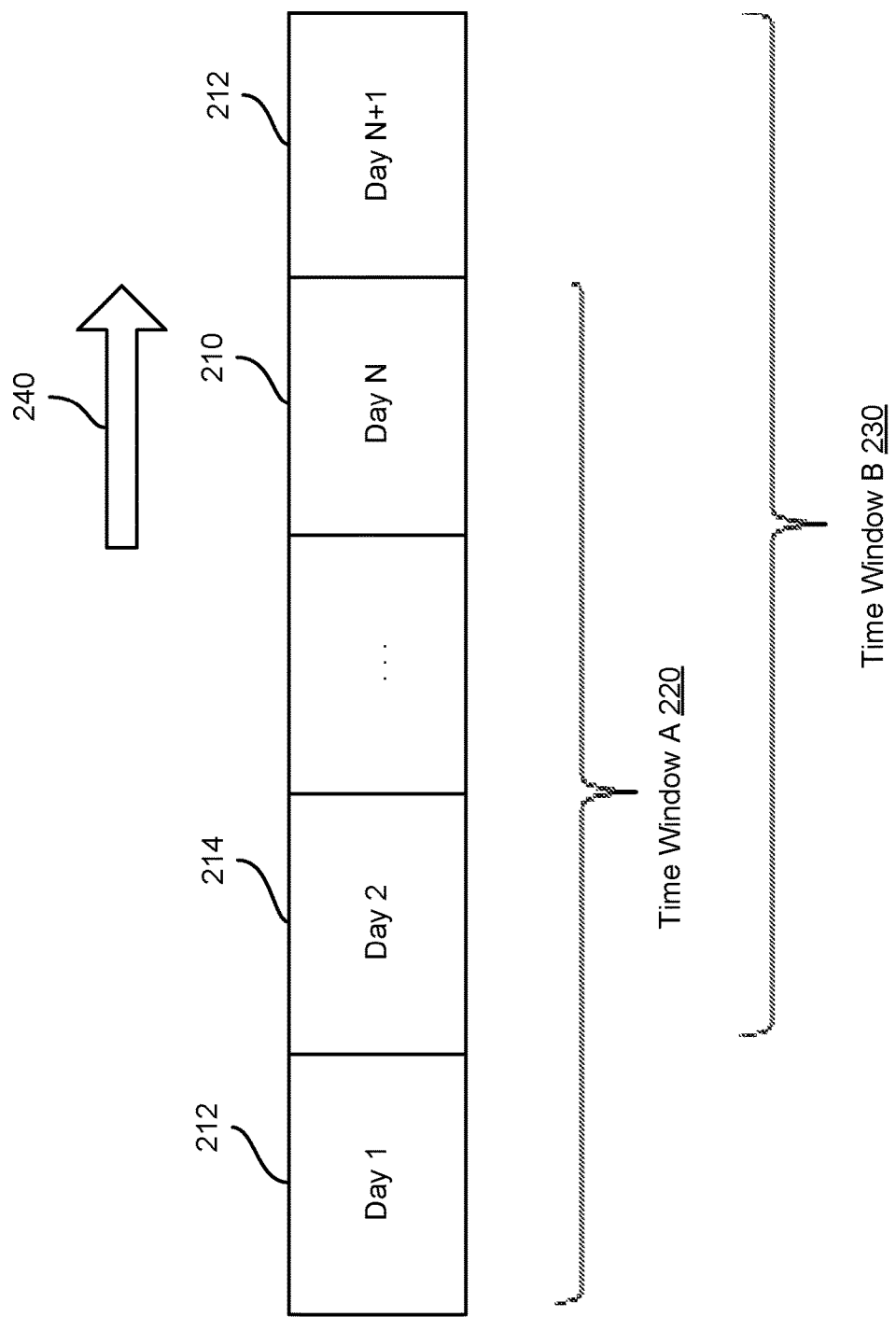
FIG. 2 illustrates an example rolling time window, according to embodiments of the present disclosure.

FIG. 2 illustrates an example rolling time window. Generally, the rolling time window may represent a time window of a particular time duration (spanning a particular number of time units) that may shift in a particular direction over time. At any point in time, the rolling time window may be defined as a function of the units of time that belong to the rolling time window at that point in time. FIG. 2 illustrates this definition at two points in time.

In particular, a first time window 220 (shown as "time window A") may span a number "N" of time units 210 and may represent the rolling time window at a first point in time. The time units 210 may be the same or different. In the illustration of FIG. 2, each time unit corresponds to a day. In this example, the first time window 220 may span a thirty day time period (e.g., "N" is equal to thirty, such that time window 220 covers "day one" through "day thirty").

A second time window 230 (shown as "time window B") may span a same number "N" of the time units 210 (e.g., thirty days) and may represent the rolling time window at a second point in time. This number may be shifted in a direction 240 relative to the first time window 220. In an example, the direction 240 may be to the right such that the second time window 230 may occur after the first time window 220. In another example, the direction 240 may be to the left such that the second time window 230 may precede the first time window 220. In addition, the shift may be by a certain number "M" of time units (e.g. shifted by one day, two days, etc.), where "M" may be less than "N." Hence, each of the time windows 220 and 230 may have "M" non-overlapping time units 212 (e.g., one day, two days, etc.) and "N-M" overlapping time units 214 relative to the other time window.

In an illustrative example, "N" may be equal to thirty days, "M" may be equal to one day, and the direction 240 may be to the right. Accordingly, the first time window 220 may span thirty days, annotated as "day one" through "day thirty." The second time window 230 may be shifted to the right by one day and may also span thirty days, annotated as "day two" through "day thirty-one." Twenty-nine overlapping days may exist, annotated as "day two" through "day thirty," where these days may fall inside both of the first and second time windows 220 and 230. In addition, two non-overlapping days may exist. "Day one" may be a non-overlapping day falling inside the first time window 220 and outside of the second time window 230. "Day thirty-one" may be a non-overlapping day falling inside the second time window 230 and outside of the first time window 220.

Figure 3:
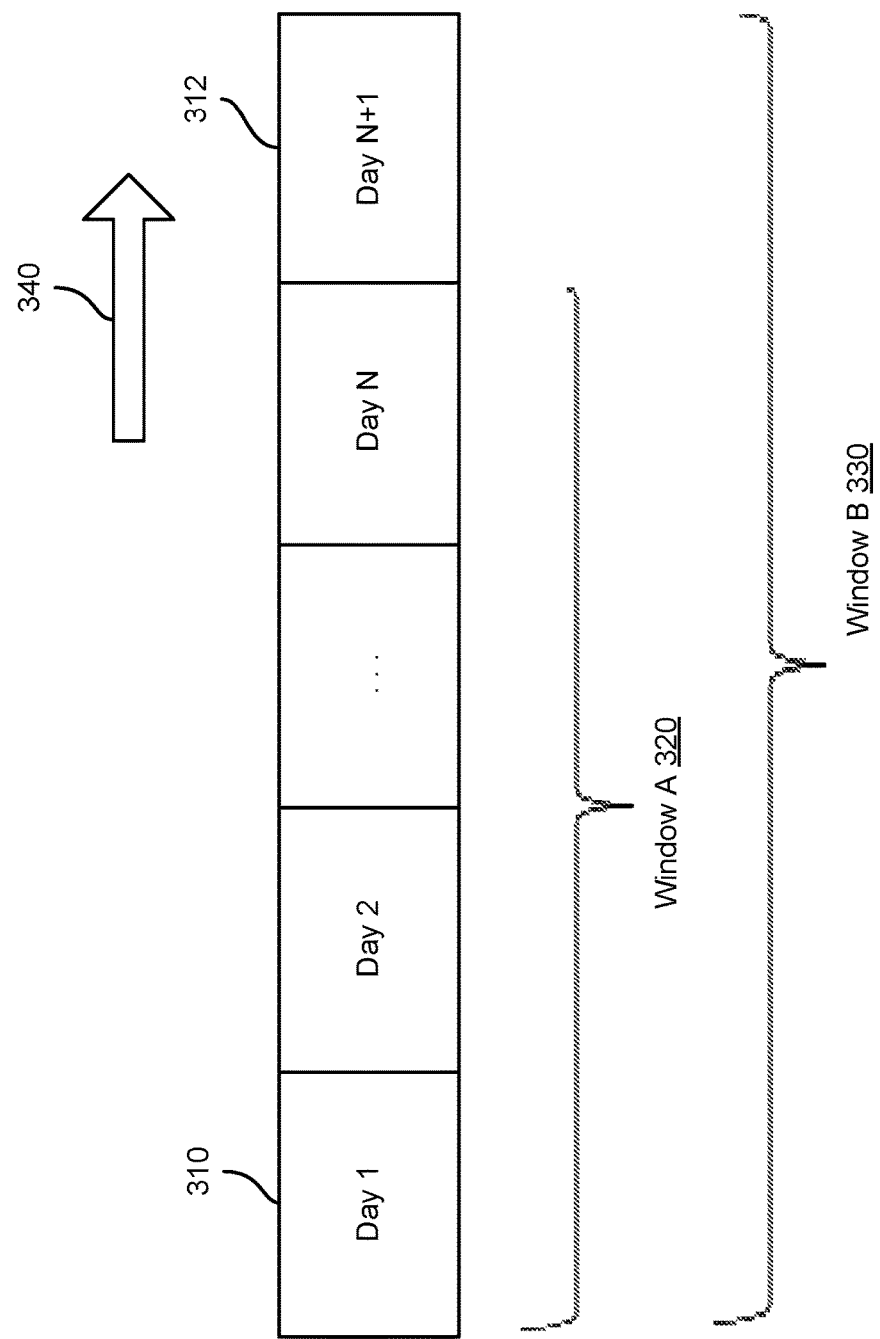
FIG. 3 illustrates an example incremental time window, according to embodiments of the present disclosure.

FIG. 3 illustrates an example incremental time window. Generally, the incremental time window may represent a time window of a time duration that may vary over time. At any point in time, the incremental time window may be defined as a function of the units of time that belong to the incremental time window at that point in time. FIG. 3 illustrates this definition at two points in time.

As illustrated, a first time window 320 (shown as "time window A") may span a number "N" of time units 310 and may represent the incremental time window at a first point in time. A second time window 330 (shown as "time window B") may span a different number "M" of the time units 310 and may represent the incremental time window at a second point in time. Hence, the size 340 (e.g. the number of the time units 310) within the incremental time window may change over time.

In an example, the size 340 may increase such that the number "M" may be greater than the number "N." In other words, the second time window 330 may include the first time window 320 and a number "M-N" of additional, non-overlapping time units 312. In another example, the size 340 may decrease such that the first time window 320 may include the second time window 330 and a number "N-M" of additional, non-overlapping time units 312.

In an illustrative example, the first time window 320 may span a period of thirty days, annotated as "day one" through "day thirty." The second time window 330 may include the first time window 320, while also having a larger size. For instance, the second time window 330 may span a period of thirty-one days, annotated as "day one" through day "thirty-one."

Figure 4:
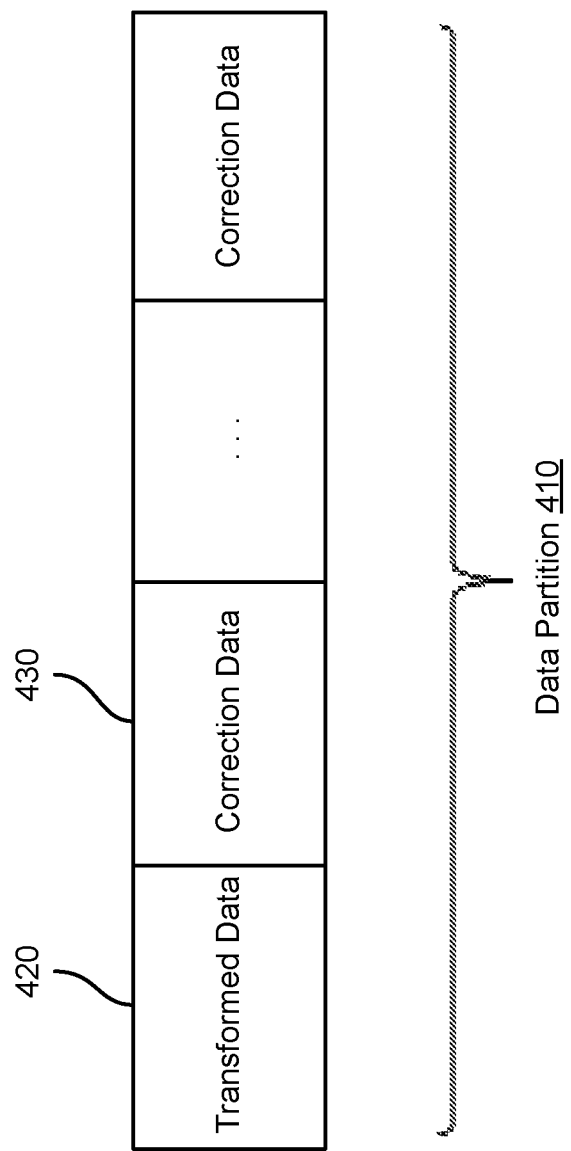
FIG. 4 illustrates an example data partition, according to embodiments of the present disclosure.

FIG. 4 illustrates an example data partition 410. Generally, the data partition 410 may correspond to a time unit. In other words, the data partition 410 may store data generated from the processing of raw data, where the raw data may have been observed during that time period. In addition, the data partition 410 may be generated per one or more of query-related parameters such as per client, item, item type, set of databases, set of data transformations, and/or other query-related parameters.

For example, two different data partitions may be generated for two different clients for a same day of observed raw data. Hence, if user inputs from clients request an average number of instantiated virtual machines per client, a data partition may be generated for each client and per day, where the data partition may store the daily number of virtual machines instantiated by that client.

In another example, two different data partitions may be generated for a same client and for a same day, where each data partition may correspond to two different types of observed raw data. Hence, if user input from the client requests an average number of instantiated virtual machines and the type of instantiated operating systems, a data partition may be generated for the daily number of virtual machines and another data partition may be generated for the daily type of operating systems.

In yet another example, user input may specify a non-linear data transformation. A set of linear data transformations may be derived from the non-linear data transformation. In this example, a data partition may be generated for each of the linear data transformation and may store processed data according to the respective linear data transformation. Alternatively, a single data partition may store all of the processed data generated by applying the set of linear data transformations. Hence, if user input requests a standard deviation of instantiated virtual machines, a data partition may be generated for the daily average and the same or another data partition may be generated for the daily deviation from the daily average.

As illustrated in FIG. 4, the data partition 410 may include multiple data fields, each storing a particular type of data. A first data field 420 may store transformed data. The transformed data may represent the data generated from the processing of the raw data observed during the time unit (e.g., the day) corresponding to the data partition 410. The processing may involve applying a data transformation (e.g., a linear and/or non-linear data transformation) to the raw data, where the data transformation may be derived from user input.

The data partition 410 may also include a set of second data fields 430. Each of the second data fields 430 may store correction data observed during subsequent time units, where the correction data may be applicable to (e.g., correct) the raw data and/or transformed data corresponding to the time unit of the data partition 410. The correction data itself may include raw and/or transformed data. Generally, the correction data may allow to forward or backward correct transformed data.

To illustrate, consider the example of average number of instantiated virtual machines for a client on a daily basis. In this example, the data partition 410 may correspond to "day one." Accordingly, the first data field 420 may store the average number of instantiated virtual machines observed on "day one." However, on "day three" a correction may have been noted. The correction may indicate that the raw data of "day one" erroneously included virtual machines for another client. Accordingly, a second field 430 may store the erroneous number. Hence, by accounting for the corrected data (e.g., the erroneous number), the true number and average of instantiated virtual machines for the client may be computed for "day one."

Figure 5:
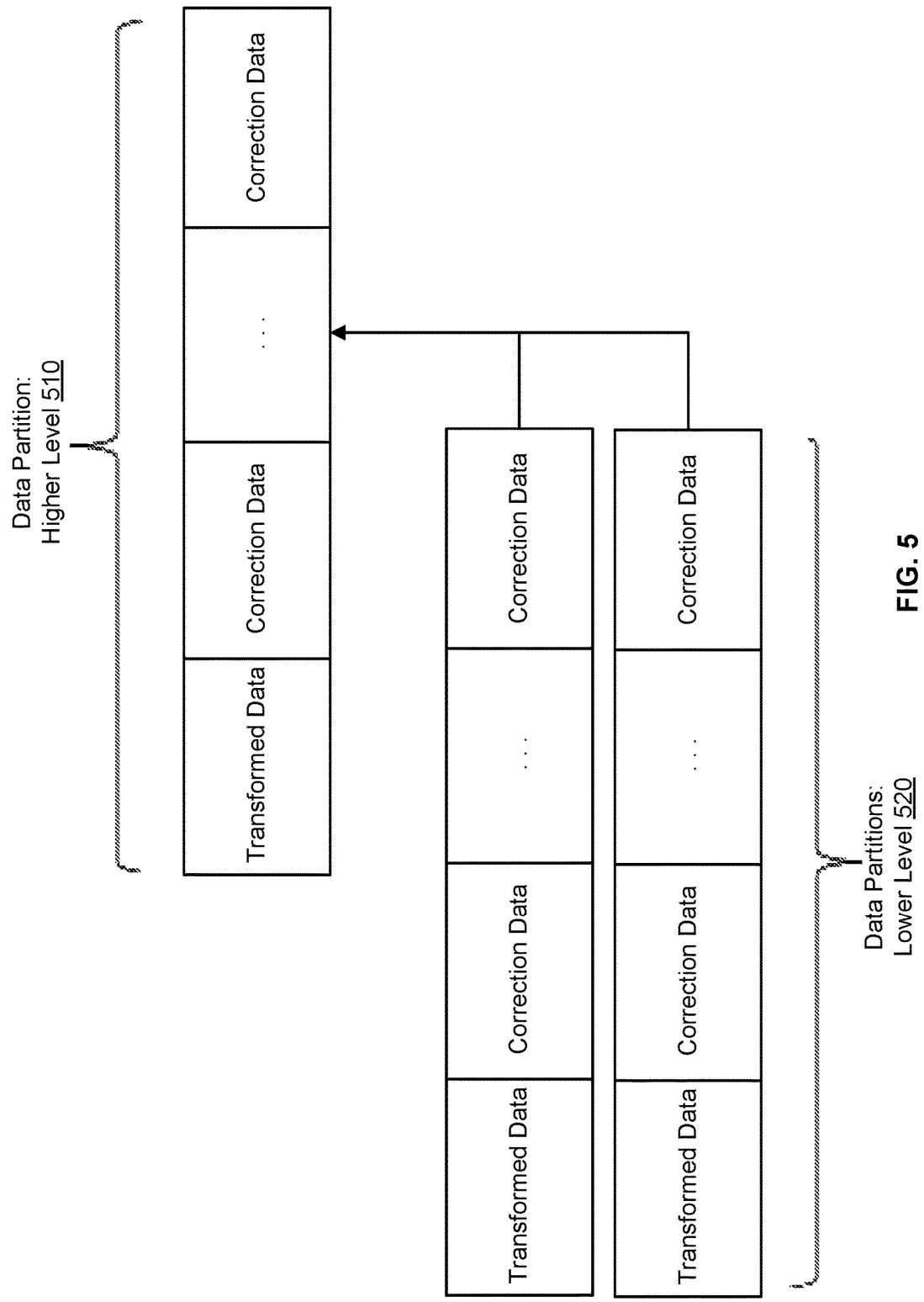
FIG. 5 illustrates example data partitions generated at different granularity levels, according to embodiments of the present disclosure.

FIG. 5 illustrates example data partitions generated at different granularity levels. In particular a number of data partitions may be generated at a particular granularity level. These data partitions may be aggregated to form a data partition at a higher granularity level. The levels of granularity may be defined across multiple dimensions. Example dimensions may include time unit, client, item, data transformation, and/or other types of granularity-related dimensions.

In an example, a higher level data partition may correspond to a time unit (e.g., a day). A lower level data partition may correspond to a time sub-unit (e.g., an hour). Hence, the lower level data partitions (e.g. the hourly data partitions) may be aggregated to form the higher level data partition (e.g., the daily partition). In this example, the time sub-units may be derived based on a number parameters related computing resource optimization. For instance, processing raw data in mini-batches may be computationally more efficient depending on processor availability, memory capacity, and network bandwidth. Accordingly, the time sub-units may correspond to the mini-batches of raw data.

In another example, a higher level data partition may correspond to an item category (or a group of clients). A lower level data partition may correspond to a particular item (or client). Hence, the lower level data partitions may be aggregated to form the higher level partition. In this example, the lower level data partitions may be defined based on how the raw data may be tracked and stored (e.g., if the raw data is tracked per item, a lower data level partition per item may be generated). In comparison, the higher level data partition may be defined based on user input (e.g., if the user input requests a query result per item category, a higher level data partition for the item category may be generated).

In yet another example, a higher level data partition may correspond to a data transformation that may be specified in user input. A lower level data partition may correspond to a particular linear data transformation derived from the specified data transformation. Hence, the lower level data partitions of individual linear data transformations may be aggregated to form the higher level partition of the specified data transformation.

As illustrated in FIG. 5, a higher level data partition 510 may be generated from a number of lower level data partitions 520. For example, the higher level data partition 510 may be an aggregation of the lower level data partitions 520. Each data partition may store transformed and corrected data, as illustrated in FIG. 4. Aggregating two or more lower level partitions 520 may include aggregating the corresponding transformed data and the corresponding corrected data such that the higher level data partition 510 may include the aggregated, transformed data and the aggregated, corrected data.

Figure 6:
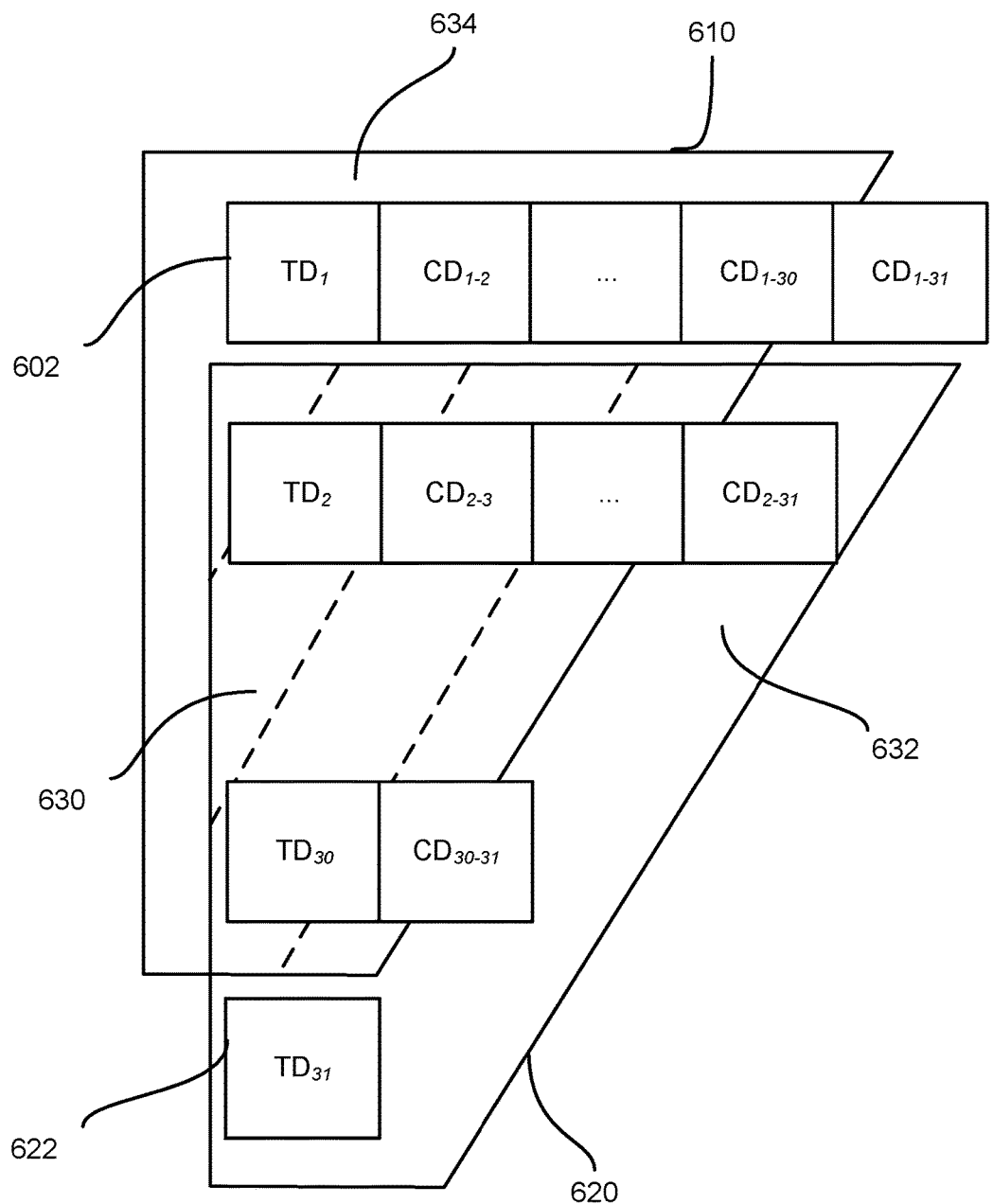
FIG. 6 illustrates an example incremental processing over a rolling time window, according to embodiments of the present disclosure.

FIG. 6 illustrates an example incremental processing over a rolling time window. In this example, the rolling window has a thirty day duration. A shift of one day is illustrated. In addition, a data partition is generated per day. However, other time units, time durations, and/or shifts are also possible. Each data partition 602 may include transformed data and correction data. FIG. 6 annotates the transformed data as "$TD_i$" and the correction data as "$CD_{i\text{-}j}$," where "i" represents the day (or, equivalently, the data partition for that day) and "j" represents a subsequent day. For instance, "$TD_1$" represents the transformed data generated from a transformation applied to raw data observed on "day one." Similarly, "$CD_{1\text{-}2}$" represents the correction data for "day one," where the correction was observed on "day two."

In the example of FIG. 6, user input requests the average number of instantiated virtual resources in a period of thirty days. Accordingly, "$TD_i$" may represent the average number per day and the "$CD_{i\text{-}j}$" may represent any corrections subsequently observed.

Assume that for the first thirty days (e.g., "day one" through "day thirty") no previous average number was computed. This may be the case when the average number is being computed for the first time such as in a cold start situation. Accordingly, the data partitions 602 for "day one" through "day thirty" may be used to compute the average number during that time window. This set of data partitions 602 is illustrated as the set 610 in FIG. 6. Hence, all "$TD_i$," "$CD_{i\text{-}j}$" are used for "i" varying between "one" and "thirty" and "j" varying between "two" and "thirty."

The next thirty days (e.g., "day two" through "day thirty-one") may overlap with the first thirty days by twenty nine days. Because the first average number has already been computed, incremental processing of the data partitions may be possible. In other words, computing the second average number from the data partitions 602 for "day two" to "day thirty-one" may not be needed. FIG. 6 shows this set of data partitions 602 as the set 620. Instead, processed data for overlapping and non-overlapping data partitions may be considered. The overlapping data partitions correspond to "day two" through "day thirty" and are illustrated as the overlapping set 630. The non-overlapping data partitions correspond to "day thirty-one" (illustrated as the non-overlapping set 632, falling inside the second set 620 and outside of the first set 610) and to "day one" (illustrated as the non-overlapping set 634, falling inside the first set 610 and outside the second set 620).

Accordingly, the incremental processing may input the first average number (corresponding to the first set 610), add the processed data from the partition of "day thirty-one" and the correction data observed on "day thirty-one" for "day two" through "day thirty" (corresponding to the first non-overlapping set 632), and subtract the processed data from the partition of "day one" (corresponding to the second non-overlapping set 634). In other words, the second average number may be computed from the first average number, "$TD_i$," where "i" is equal to "one" and "thirty-one," and from "$CD_{i\text{-}j}$," where when "i" equals "one," "j" varies between "two" and "thirty," and where when "j" equals "thirty-one," "i" varies between "two" and "thirty."

The incremental processing may avoid the need to generate the second average number by computing the data stored in the overlapping set 610. In other words, the incremental processing may avoid a computation that involves "$TD_i$" and "$CD_{i\text{-}j}$," where "i" varies between "two" and "thirty" and "j" varies between "three" and "thirty," thereby saving usage of processors, memories, and network bandwidth. In this thirty day example, the cold start may need a total of "$\Sigma_{k=1}^{30} K = 465$" computations. This number of computations would be needed for each rolling time window if no incremental data processing is implemented. In comparison, the incremental processing may need a total of "1+31+30=62" computations representing about 87% of relative reduction in computation, where "1" corresponds to the first average number, "31" to the first non-overlapping set 632, and "30" to the second non-overlapping set 634.

In addition, because each data partition 602 may store correction data for the corresponding day, correcting for the day's contribution may be possible. For example, for "day one," "$TD_1$" may be corrected using "$CD_{i\text{-}j}$," where "j" varies between "day two" and "day thirty-one." Thus, if a client requests the true contribution of "day one" (e.g., the true average number of instantiated virtual machines for that day), that contribution may be properly computed from the data partition 602 of "day one" (e.g., equals "$TD_1$" minus "$CD_{1\text{-}j}$").

Although FIGS. 2-6 illustrate time windows and time units for generating data partitions and query results, other dimensional windows and units may be similarly used. For instance, a geographic window and a geographic unit may be used. Each geographic unit may represent a geographic location (e.g., a zip code, a city, etc.). Each geographic window may represent a set of the geographic locations (e.g., a city, a county, etc.). A data partition may be generated for each geographic unit (or geographic sub-unit if multiple granularity levels are used as in FIG. 5). A query result for a geographic window may be incrementally generated based on the query result of another geographic window that has some overlapping geographic units and based on data partitions corresponding to non-overlapping geographic regions.

To illustrate, a client may provide user input specifying that the average number of instantiated virtual machines should be queried for two geographic areas that share a number of zip codes. Accordingly, data partitions may be generated per zip code. The average number for the first geographic area may be generated from the data partitions applicable to the zip codes of the first geographic area. In comparison, the average number for the second geographic area may be incrementally generated from the first average number and by accounting for the number of virtual machines instantiated from non-overlapping zip codes, wherein this number may be derived from data partitions corresponding to the non-overlapping zip codes.

Generally, the data partitioning and the incremental data processing may depend on user input. In particular, the user input may specify one or more query-related parameters. A query engine or, more generally, a data processing system may generate data partitions and perform the incremental data processing based on the query-related parameter(s).

Figure 7:
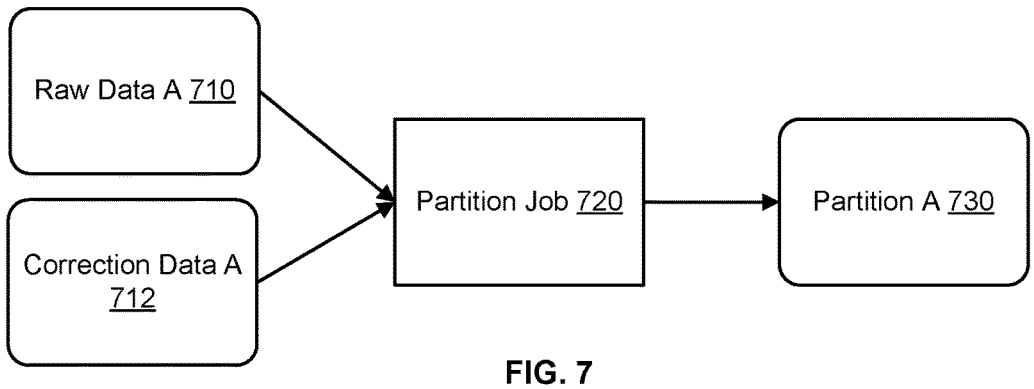
FIG. 7 describes an example job for generating a data partition, according to embodiments of the present disclosure.
Figure 8:
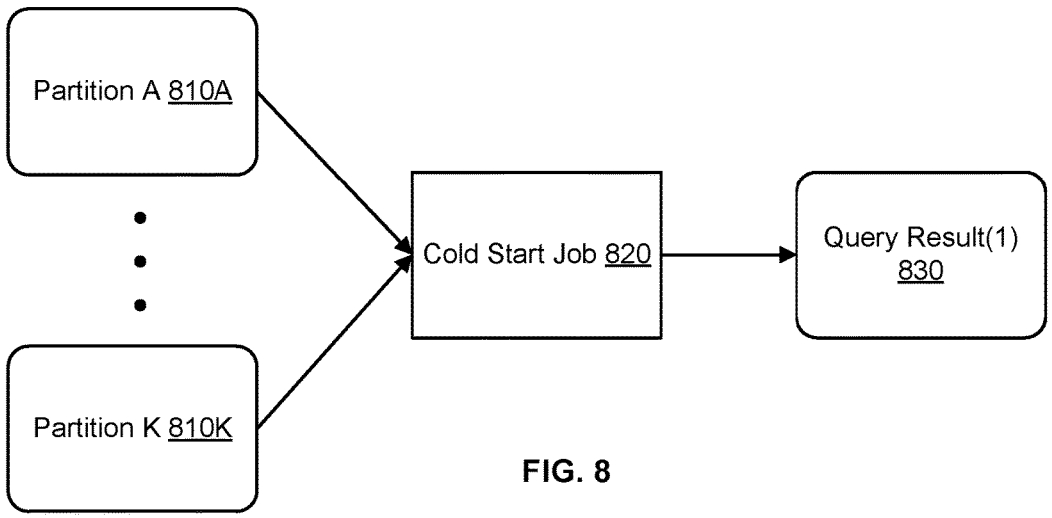
FIG. 8 describes an example job for generating a query result in a cold start situation, according to embodiments of the present disclosure.
Figure 9:
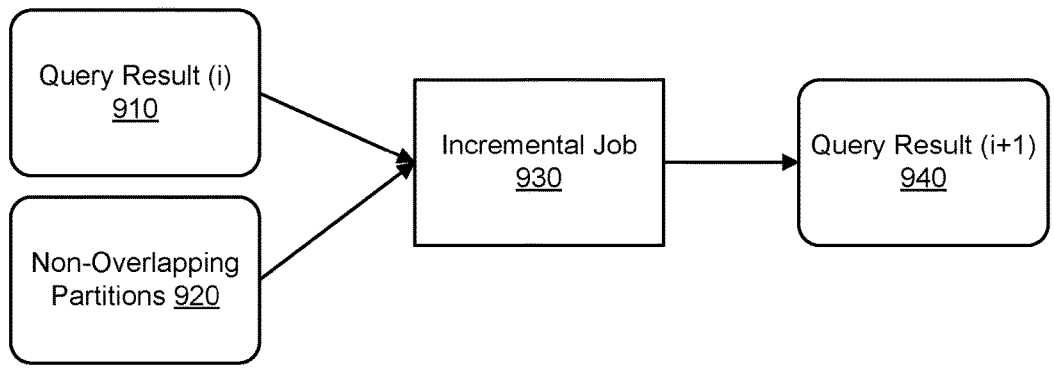
FIG. 9 describes an example job for generating a query result based on incremental data processing, according to embodiments of the present disclosure.

In an example, the user input may be received via a user interface. In particular, the user interface may be provided to a client and may present fields for specifying values for the query-related parameters. An operator of the client may input the values in the fields (e.g., may specify storage locations, duration of a time window, etc.). Once those values are received, the query engine or, more generally, the data processing system may generate and schedule jobs to process raw data, where this processing may be incremental based on data partitions. Each job may be set as a JavaScript, or some other code (e.g., some other scripting code), having properties that correspond to the received values. FIGS. 7-9 illustrate three example jobs. Generally, a job can be executed based on one or more types of scheduling. One example scheduling type may include batch processing. In this example, once raw data for a time unit is observed for the length of the time unit, a job may be scheduled. Another example scheduling type may include mini-batch processing. In this example, one or more optimization parameters (e.g., processing power, memory capacity, network bandwidth) may be considered to mini-batch a sub-portion of the raw data corresponding to the time unit. For instance, if the time unit is a day and if mini-batching can be optimally performed every one hour, jobs are scheduled on an hourly basis. Yet another example scheduling may be continuous. In this example, a job may be continuously run or performed as raw data is observed. For instance, a job to generate and update a data partition for a day may be continuously performed in parallel to raw data for that day being observed.

FIG. 7 describes an example job for generating a data partition. In particular, raw data 710 corresponding to a particular unit of time (shown as raw data "A" in FIG. 7) may be accessed. A partition job 720 may be generated to process the raw data 710 and output a data partition 730 corresponding to the particular unit of time (shown as partition "A" in FIG. 7). The partition job 720 may apply a data transformation to the raw data 710 to generate and store transformed data in the data partition 730. In addition, as correction data 712 for the particular unit of time becomes available, the partition job 720 may accordingly update the data partition 730. The update may include storing the correction data 712 in the data partition 730 or updating the already stored transformed data.

FIG. 8 describes an example job for generating a query result in a cold start situation. A cold start may occur when no previous query result exists and, thus, incremental data processing may not be possible yet. As illustrated, a query result may be needed for a time window that may span "K" time units. "K" data partitions 810A-K may have been generated based on partition jobs. Accordingly, the data partitions 810A-K may be accessed. A cold start job 820 may be generated to process data from the data partitions 810A-K and output a first query result 830 (show as "query result(1) in FIG. 8). The processing may include applying a data transformation(s) to the data from the data partitions 810A-K to generate the query result 830. In situations where different granularity levels of data partitions exist, the processing may also involve aggregating the data from lower granularity levels.

FIG. 9 describes an example job for generating a query result based on incremental data processing. A previous query result 910 (shown as query result (i)) may already exist and may correspond to a previous time window (e.g., time window (i)). A next time window (e.g., time window (i+1)) having some overlapping time units (and, equivalently, data partitions) with the previous time window. In addition, the two time windows may have non-overlapping time units (and, equivalently, non-overlapping data partitions 920). Accordingly, incremental data processing may be possible based on the previous query result 910 and data from the non-overlapping data partitions 920. An incremental job 930 may be generated to output a next query result 940 (shown as next query result (i+1)). The next query result 940 may be generated by updating the previous query result 910 according to the data from the non-overlapping data partitions 920.

Figure 10:
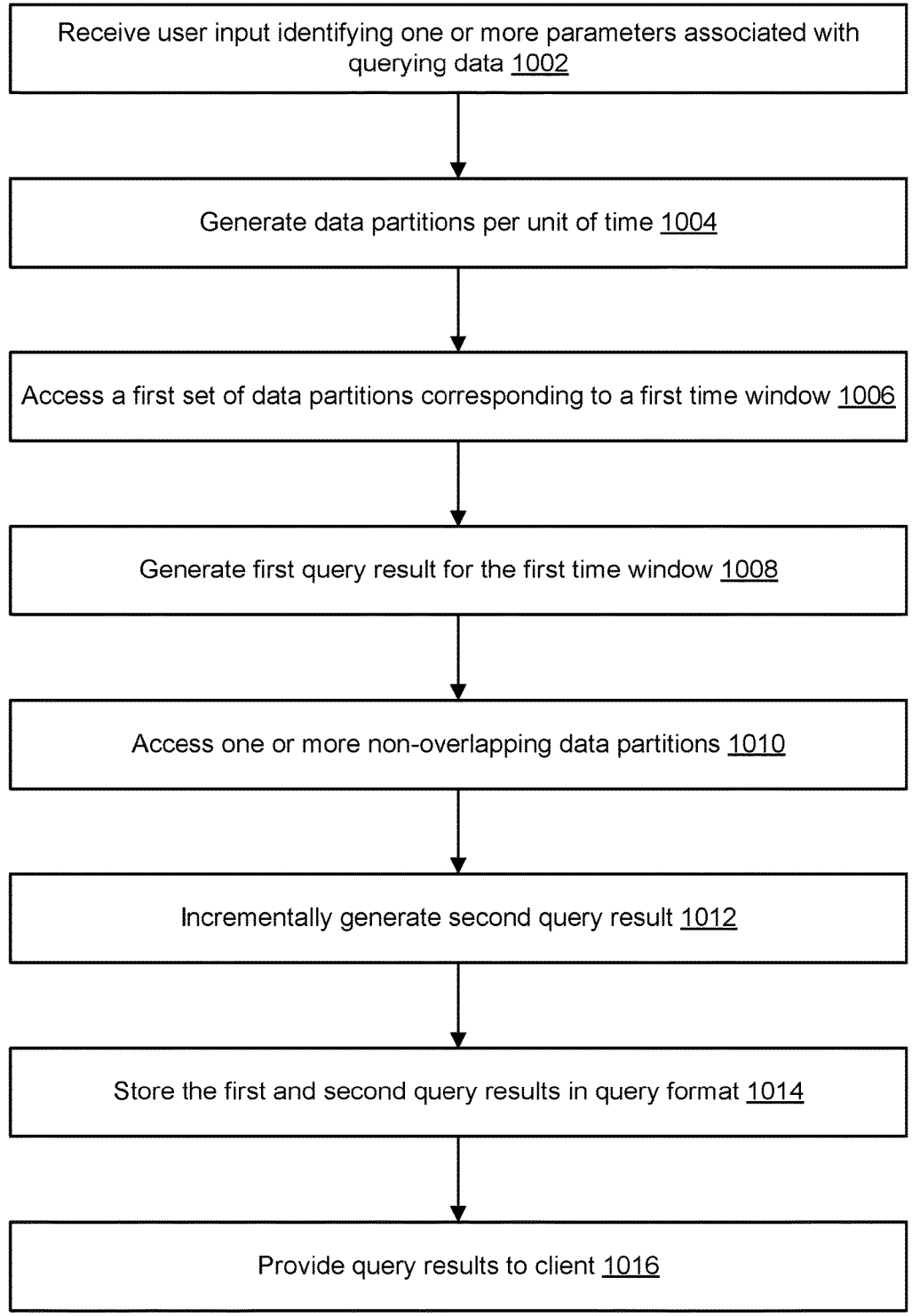
FIG. 10 illustrates an example flow for incremental data processing, according to embodiments of the present disclosure.

FIG. 10 illustrates an example flow for incremental data processing. A computer system is illustrated as performing operations of the example flow. In an example, the computer system may represent a data processing system and/or may host a query engine (e.g., the query engine 110 of FIG. 1). Generally, the computer system may include a processor and a memory coupled to the processor. The processor may execute computer-readable instructions stored in the memory. The computer-readable instructions may include instructions for performing the operations.

The example flow may start at operation 1002, where the computer system may receive user input. The user input may identify one or more parameters associated with querying data or databases distributed across a plurality of storage locations within a computer network. Examples of the parameters may include item(s) of interest, desired databases, database, data transformations, and time durations of the time windows, resolution of the time units, and/or other query-related parameters. In an example, the computer system may provide a user interface over an API or a web interface to a client. The user interface may include fields corresponding to the parameters. The user input may include values for the parameters inputted at the fields.

At operation 1004, the computer system may generate data partitions per unit of time. For example, the computer system may run a partition job to generate the data partitions. The partition job may be run according to one or more scheduling types, such as based on batching, mini-batching, or continuous schedules. Each data partition may correspond to a unit of time (e.g., a day) and may be specifically generated based on the user input (e.g., for a same day, there may be one data partition for one item and another data partition for another item). Further, each data partition may store transformed data and correction data based on a processing of raw data for the respective day, where the processing may apply a data transformation derived from the user input. In addition, based on different optimization parameters, the computer system may generate different granularity levels for the data partitions and may aggregate lower granularity level data partitions to form higher granularity level data partitions. Example optimization parameters may include available processing power, memory capacity, network bandwidth, and/or other optimization-related parameters. The data partitions may be stored at a central storage location or distributed across the plurality of storage locations.

At operation 1006, the computer system may access a first set of data partitions corresponding to a first time window. The duration of the first time window may be derived from the user input. The first time window may span a number of time units. The first set of data partitions may correspond to the spanned time units. The computer system may access the data stored in this set of data partitions from the storage location(s) storing the data partitions.

At operation 1008, the computer system may generate a first query result for the first time window. If no previous query result exists, the computer system may run a cold start job to generate the first query result. The cold start job may be run according to one or more scheduling types, such as based on batching, mini-batching, or continuous schedules. Otherwise, the computer system may run an incremental job.

Assuming a cold start, the computer system may generate the first query result by processing the data from the first set of partitions according to the data transformation derived from the user input. For instance, the first query result may include an aggregation of the data from the data partition. The aggregation may involve, for example, summation, subtraction, and/or other mathematical and statistical operations. Assuming an incremental data processing, the computer system may generate the first query result by updating the previous query result according to non-overlapping data partitions.

At operation 1010, the computer system may access one or more non-overlapping data partitions. In particular, a second time window may overlap to some extent with the first time window. In addition, one or both of the time windows may have one or more non-overlapping time units relative to the other time window. The non-overlapping time unit(s) may correspond to non-overlapping data partition(s). The computer system may access data stored in the non-overlapping data partition(s) from the storage location(s) storing the data partitions. For instance, a data partition corresponding to a time unit that falls inside the second time window and outside of the first time window may be a non-overlapping data partition. The computer system may access that non-overlapping data partition to support the incremental data processing.

At operation 1012, the computer system may incrementally generate a second query result. For example, the computer system may run an incremental job to generate the second query result. The incremental job may be run according to one or more scheduling types, such as based on batching, mini-batching, or continuous schedules In particular, the first query result may be updated based on the data from the non-overlapping data partition(s) of the two time windows. Hence, a first data partition corresponding to a time unit that falls inside the second time window and outside of the first time window and a second data partition corresponding to a time unit that falls inside the first time window and outside of the second time window may be considered. Data from these two non-overlapping data partitions may be used to update the first query result.

At operation 1014, the computer system may store the first and second query results in a query result format. The query results may be stored at a central storage location or may be distributed across a plurality of storage locations. The query result format may enable the client to remotely access and present the query results.

At operation 1016, the computer system may provide the query result to the client. For example, the computer system may update the user interface to present the query results. The presentation may use various formats including, for example, a dashboard format.

Figure 11:
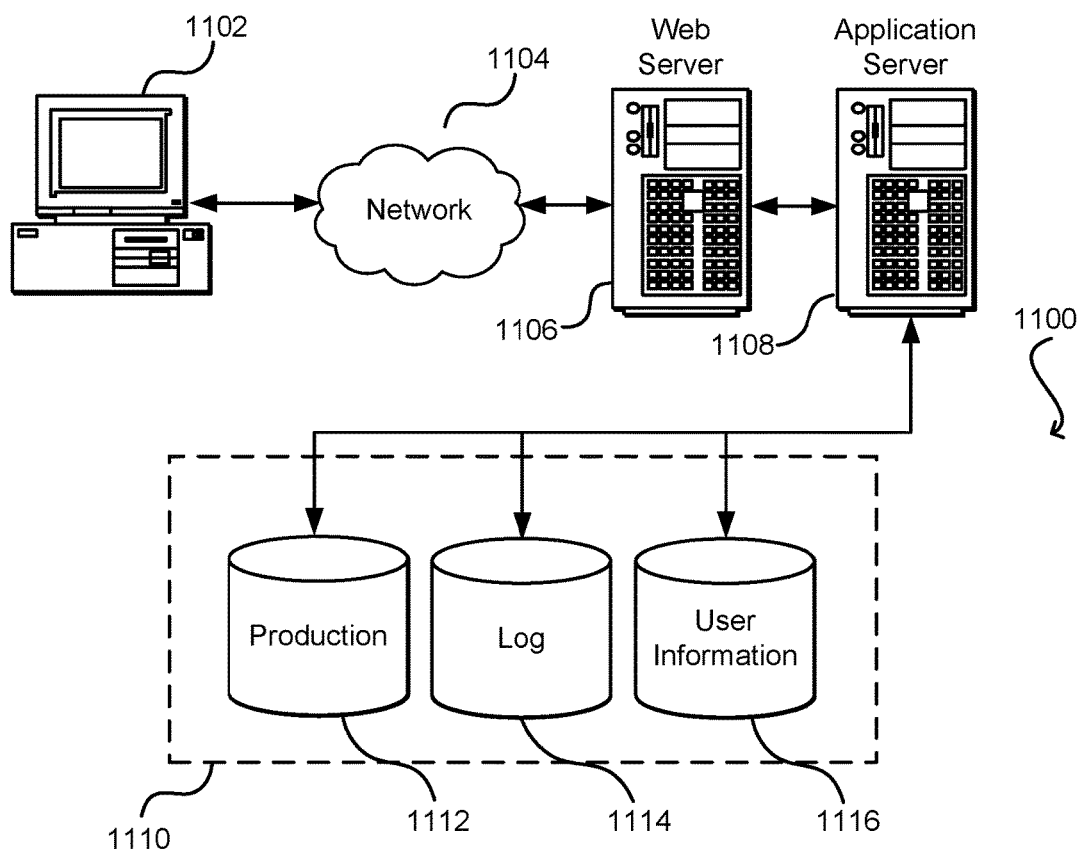
FIG. 11 illustrates an environment in which various features of the inventory system can be implemented, according to embodiments of the present disclosure.

FIG. 11 illustrates aspects of an example environment 1100 for implementing aspects in accordance with various embodiments. The example environment 1100 may include components that may be implemented to support a data processing system or a query engine. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer system, comprising:
    a processor; and
    a memory communicatively coupled with the processor and storing computer-readable instructions that, upon execution with the processor, configure the computer system to at least:
        receive user input associated with querying databases, the user input identifying the databases, a database schema, a data transformation, and a time duration for query results;
        for a time window spanning the time duration:
            determine time units that fall inside the time window,
            for each time unit and based at least in part on the user input, access data from the databases and generate a data partition, the data corresponding to the time unit, the data partition storing transformed data that is generated based at least in part on an application of the data transformation to the data, and
            generate a query result based at least in part on transformed data stored in data partitions of the time window;
        for a next time window spanning the time duration, having a next time unit, and excluding a previous time unit that falls inside the time window:
            generate a next data partition corresponding to the next time unit and storing next transformed data,
            access previous transformed data of a previous data partition corresponding to the previous time unit,
            access the query result of the time window, and
            generate a next query result for the next time window based at least in part on the next transformed data of the next data partition, the previous transformed data of the previous data partition, and the query result of the time window; and
        store the query result and the next query result based at least in part on a query result format to facilitate the querying of the databases.

2. The computer system of claim 1, wherein each data partition that corresponds to a time unit further stores corrections that are associated with the data corresponding to the time unit and that are observed during other time units, and wherein the query result is further generated based at least in part on corrections stored in the data partitions.

3. The computer system of claim 1, wherein the databases are distributed across multiple storage locations, and wherein the data partitions are stored in a storage location without copying the data from the databases to the storage location.

4. The computer system of claim 1, wherein the user input is received at a user interface provided by the computer system, and wherein the query result and the next query result are generated based at least in part on jobs scheduled based on the user input at the user interface.

5. A computer-implemented method, comprising:
receiving, by a computer system, user input identifying one or more parameters associated with querying data;
generating, by the computer system, data partitions based at least in part on the user input, each data partition corresponding to a time unit and storing transformed data that is generated from a portion of the data corresponding to the time unit;
accessing, by the computer system, first transformed data from a first data partition corresponding to a first time unit, the first time unit falling inside a first time window and outside a second time window, the first time window and the second time window having one or more overlapping time units;
accessing, by the computer system, a first query result of the first time window, the first query result generated based at least in part on a subset of the data partitions corresponding to the first time window;
accessing, by the computer system, second transformed data from a second data partition corresponding to a second time unit, the second time unit falling outside of the first time window and inside the second time window;
generating, by the computer system, a second query result for the second time window based at least in part on the first transformed data, the second transformed data, and the first query result; and
processing the second query result, the processing comprising at least one of presenting the second query result or storing the second query result.

6. The computer-implemented method of claim 5, further comprising:
accessing third transformed data from a third data partition, the third data partition corresponding to a third time unit that falls inside the first time window and outside of the second time window,
wherein the second query result is further generated based at least in part on the third transformed data.

7. The computer-implemented method of claim 6, wherein the user input is associated with querying databases that store the data, wherein the user input identifies the databases, a data transformation, and a time duration for query results, wherein the first time window and the second time window span the time duration, and wherein the first query result and the second query result are stored based at least in part on a query result format to facilitate the querying of the databases.

8. The computer-implemented method of claim 5, wherein the data transformation is a linear data transformation, wherein the user input identifies a non-linear data transformation for generating the second query result, and further comprising:
deriving the linear data transformation from the non-linear data transformation,
wherein the second transformed data is generated based at least in part on an application of the linear data transformation to the data.

9. The computer-implemented method of claim 8, further comprising:
deriving an additional linear data transformation from the non-linear data transformation; and
generating an additional data partition that stores additional transformed data, the additional transformed data generated from an application of the additional linear data transformation to the data,
wherein the second query result is further generated based at least in part on the additional transformed data.

10. The computer-implemented method of claim 8, further comprising: deriving an additional linear data transformation from the non-linear data transformation, and wherein the transformed data is further generated based at least in part on an application of the additional linear data transformation to the data.

11. The computer-implemented method of claim 5, further comprising:
determining time sub-units that collectively form the time unit; and
for each time sub-unit, generating a corresponding data partition storing corresponding transformed data,
wherein the second transformed data stored in the second data partition is generated based at least in part on an aggregation of the corresponding transformed data from the corresponding data partitions across the time sub-units.

12. The computer-implemented method of claim 11, wherein the time sub-units are determined based at least in part on one or more of: available processing power of the computer system, available memory storage of the computer system, or available network bandwidth between the computer system and storage locations storing the data.

13. The computer-implemented method of claim 5, wherein the second query result is associated with a granularity level based at least in part on the user input, wherein the second data partition is associated with a lower granularity level, and wherein the second query result is generated based on an aggregation of a plurality of transformed data from a plurality of data partitions at the lower granularity level.

14. A non-transitory computer-readable storage medium comprising instructions that, upon execution with a processor, configure a computer system to perform operations comprising:
receiving user input identifying one or more parameters associated with querying data;
generating data partitions based at least in part on the user input, each data partition corresponding to a time unit and storing transformed data that is generated from a portion of the data corresponding to the time unit;
accessing first transformed data from a first data partition corresponding to a first time unit, the first time unit falling inside a first time window and outside a second time window, the first time window and the second time window having one or more overlapping time units;
accessing a first query result of the first time window, the first query result generated based at least in part on a subset of the data partitions corresponding to the first time window;
accessing second transformed data from a second data partition corresponding to a second time unit that falls inside the second time window and outside of the first time window;

generating a second query result for the second time window based at least in part on the first transformed data, the second transformed data, and the first query result; and storing the second query result based at least in part on a query result format.

15. The non-transitory computer-readable storage medium of claim 14, wherein the data is distributed across a plurality of storage locations within a private network, wherein the user input is received by the computer system from a client device over at least one of: an application programming interface (API) or a web interface, and wherein the second query result is stored within the private network and available to the client device via the API or the web interface.

16. The non-transitory computer-readable storage medium of claim 14, wherein the operations further comprise: providing a user interface configured to present the first query result and the second query result based at least in part on a dashboard format.

17. The non-transitory computer-readable storage medium of claim 14, wherein the first data partition further stores correction data about the first time unit and observed at the second time unit, and wherein the first query result is generated based at least in part on the first transformed data and the correction data.

18. The non-transitory computer-readable storage medium of claim 17, further comprising: updating the first transformed data based at least in part on the correction data.

19. The non-transitory computer-readable storage medium of claim 14, wherein the data is distributed across a plurality of storage locations, and wherein the data partitions are stored at a storage location.

20. The non-transitory computer-readable storage medium of claim 14, wherein the data is distributed across a plurality of storage locations, and wherein the data partitions is distributed across the plurality of storage locations.

* * * * *